(12) United States Patent
Parsons et al.

(10) Patent No.: US 11,005,195 B2
(45) Date of Patent: May 11, 2021

(54) ENCAPSULATED IPC LUG CONNECTOR

(71) Applicant: Hubbell Incorporated, Shelton, CT (US)

(72) Inventors: Sarah Jane Parsons, Medford, MA (US); Kris Robin Boutin, Mont Vernon, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/867,618

(22) Filed: May 6, 2020

(65) Prior Publication Data

US 2020/0266555 A1    Aug. 20, 2020

Related U.S. Application Data

(63) Continuation of application No. 16/269,753, filed on Feb. 7, 2019, now Pat. No. 10,680,351.

(60) Provisional application No. 62/627,362, filed on Feb. 7, 2018.

(51) Int. Cl.
| | |
|---|---|
| *H01R 4/24* | (2018.01) |
| *H01R 4/2408* | (2018.01) |
| *H01R 4/46* | (2006.01) |
| *H01R 4/42* | (2006.01) |
| *H01R 4/2406* | (2018.01) |
| *H02S 40/34* | (2014.01) |
| *H01R 4/36* | (2006.01) |

(52) U.S. Cl.
CPC ......... *H01R 4/2408* (2013.01); *H01R 4/2406* (2018.01); *H01R 4/36* (2013.01); *H01R 4/42* (2013.01); *H01R 4/46* (2013.01); *H02S 40/34* (2014.12)

(58) Field of Classification Search
CPC ...... H01R 4/2406; H01R 4/2408; H01R 4/46; H01R 4/42; H01R 4/36; H02S 40/34
USPC .......................................................... 439/429
See application file for complete search history.

(56) References Cited

U.S. PATENT DOCUMENTS

| | | | | |
|---|---|---|---|---|
| 832,876 | A * | 10/1906 | Peirce, Jr. ................ | H01R 4/42 439/794 |
| 1,932,009 | A * | 10/1933 | Becker ..................... | H01R 4/42 439/792 |
| 1,946,752 | A * | 2/1934 | Miller ...................... | H01R 4/40 24/115 R |

(Continued)

*Primary Examiner* — Abdullah A Riyami
*Assistant Examiner* — Vladimir Imas
(74) *Attorney, Agent, or Firm* — Dilworth IP, LLC (57) ABSTRACT

An electrical connector, including a body formed from an electrically conductive material, the body defining an open channel configured to receive a first electrical conductor, at least one first threaded hole transverse to and in communication with the open channel, a plurality of bores extending toward the open channel, each bore configured to receive a second electrical conductor, and a second threaded hole associated with each bore transverse to and in communication with the associated bore. At least one first set screw is configured to mate with the at least one first threaded hole in communication with the open channel and configured to secure the first electrical conductor within the open channel. A plurality of second set screws are configured to mate with the second threaded holes in communication with an associated bore and configured to secure the second electrical conductor within the bore.

20 Claims, 7 Drawing Sheets

(56) References Cited

U.S. PATENT DOCUMENTS

| | | | | |
|---|---|---|---|---|
| 2,287,453 A * | 6/1942 | Ruch | | H01R 4/42 439/792 |
| 4,964,813 A * | 10/1990 | Francois | | H01R 9/03 439/521 |
| 5,759,072 A * | 6/1998 | Chadbourne | | H01R 4/42 439/814 |
| 6,210,206 B1 * | 4/2001 | Durham | | H01R 4/2408 324/133 |
| 6,338,658 B1 | 1/2002 | Sweeney | | |
| 6,347,967 B1 * | 2/2002 | Tamm | | H01R 4/40 403/322.1 |
| 6,548,762 B2 * | 4/2003 | Jiles | | H02G 7/22 174/78 |
| 6,579,131 B1 | 6/2003 | Ashcraft et al. | | |
| 7,044,776 B2 * | 5/2006 | King, Jr. | | H01R 4/36 439/521 |
| 7,052,333 B2 | 5/2006 | Siracki et al. | | |
| 7,056,163 B2 * | 6/2006 | Hay | | H01R 4/36 439/810 |
| 7,075,021 B2 * | 7/2006 | Rowe | | H01H 1/5855 174/68.2 |
| 7,306,476 B2 * | 12/2007 | Gerlich | | H01R 4/2408 439/394 |
| 7,520,786 B2 * | 4/2009 | Triantopoulos | | H01R 11/09 439/798 |
| D592,603 S | 5/2009 | Sweeney et al. | | |
| D593,500 S | 6/2009 | Sweeney et al. | | |
| D593,501 S | 6/2009 | Sweeney et al. | | |
| D593,502 S | 6/2009 | Sweeney et al. | | |
| D593,956 S | 6/2009 | Sweeney et al. | | |
| D593,957 S | 6/2009 | Sweeney et al. | | |
| D593,958 S | 6/2009 | Sweeney et al. | | |
| D594,825 S | 6/2009 | Sweeney et al. | | |
| D594,826 S | 6/2009 | Sweeney et al. | | |
| 7,591,656 B1 * | 9/2009 | Gretz | | H01R 4/36 439/108 |
| 7,618,299 B2 * | 11/2009 | Ferretti | | H01F 27/04 439/798 |
| D626,087 S * | 10/2010 | Kiely | | D13/148 |
| 7,896,714 B2 * | 3/2011 | Moist | | H01R 4/36 439/793 |
| 7,931,508 B1 * | 4/2011 | Carr | | H01R 4/36 439/798 |
| 7,942,679 B1 * | 5/2011 | Gretz | | H01R 4/36 439/108 |
| 7,963,811 B2 * | 6/2011 | Wason | | H01R 4/64 439/798 |
| 8,025,508 B2 | 9/2011 | Parker et al. | | |
| D648,281 S * | 11/2011 | Cerasale | | D13/151 |
| D652,388 S * | 1/2012 | Cerasale | | D13/151 |
| 8,277,263 B1 * | 10/2012 | Smith | | H01R 4/32 439/779 |
| 8,425,264 B2 * | 4/2013 | Michell | | H01R 4/42 439/789 |
| 8,678,852 B2 * | 3/2014 | Rineau | | H01R 4/2408 439/402 |
| 8,727,818 B2 | 5/2014 | Kossak | | |
| 9,082,560 B2 * | 7/2015 | Helms | | H01H 1/06 |
| D773,388 S | 12/2016 | Sweeney | | |
| 2009/0163087 A1 * | 6/2009 | Sweeney | | H01R 4/26 439/798 |
| 2011/0237140 A1 * | 9/2011 | Cerasale | | H01R 4/646 439/797 |

\* cited by examiner

ENCAPSULATED IPC LUG CONNECTOR

BACKGROUND

The present disclosure relates to electrical connectors, and more particularly, to an insulation piercing connector (IPC).

Figure 1:
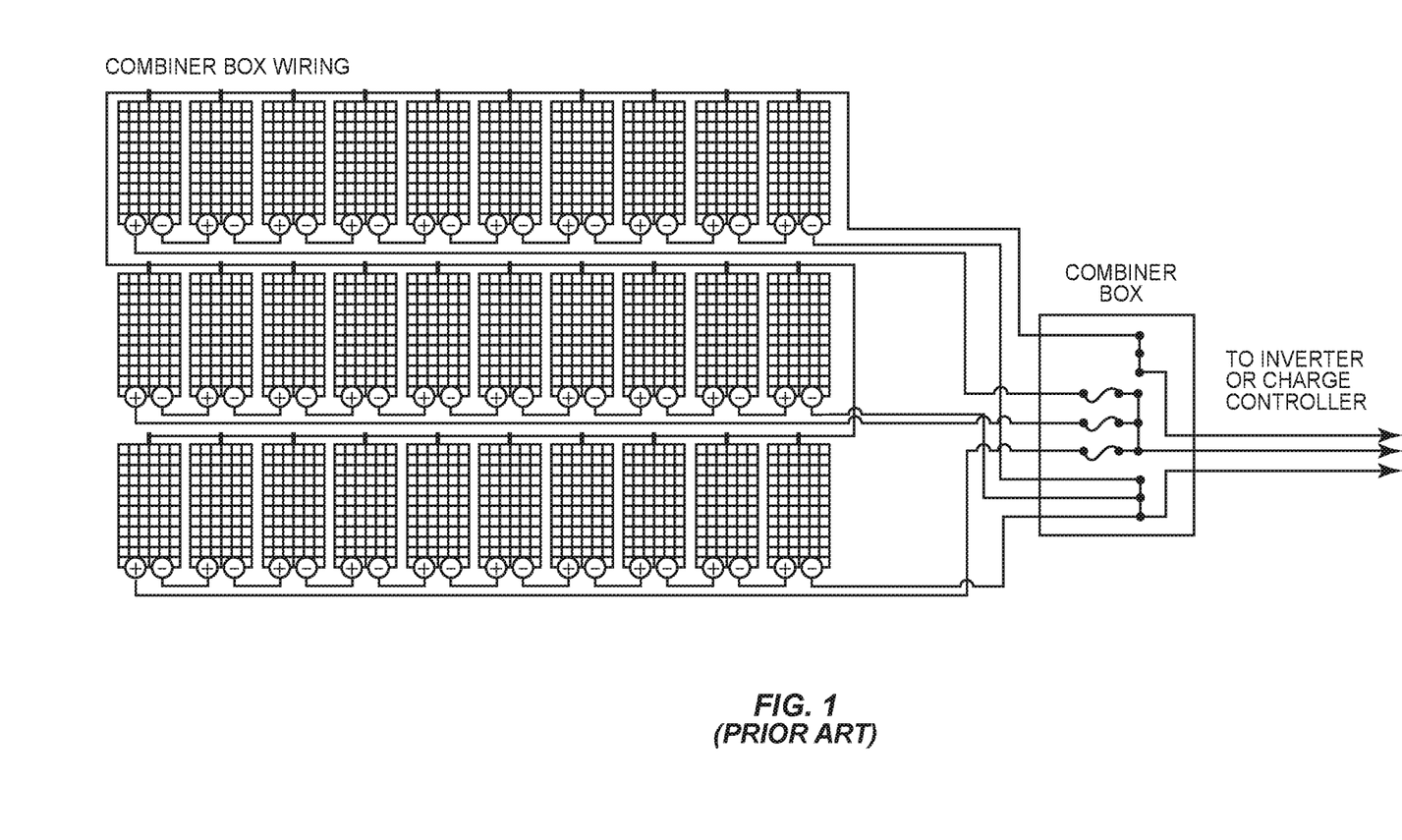
FIG. 1 is a diagram illustrating a PV system according to the prior art.

IPCs are often used to make an electrical connection from one or more smaller electrical conductors (i.e., wires) to a larger electrical conductor (i.e., wire). Solar engineering procurement and construction (EPC) and developers attempt to reduce the number of components in a photovoltaic (PV) system that will reduce the overall cost of installation. In current PV systems as illustrated in FIG. 1, PV modules are connected together in series. PV wires exiting the back of the PV module connect each module together via MC4 connectors. Traditionally the PV wires from the back of the PV module are fed into a combiner box to be combined then trenched to an inverter. This use of a combiner boxes and trenching greatly increases the cost of the PV system.

Therefore, there is a need to eliminate the combiner boxes and the trenching required to install a PV system.

The present invention solves these and other problems in the prior art.

SUMMARY

One application for the IPC according to the present disclosure is in the field of solar panel connectivity. An encapsulated IPC lug connector according to the present disclosure provides the means to connect PV wires from the back of the PV module to the relatively larger aluminum (AL) power wires for both the positive and negative electrical connections. The larger AL wires are then run throughout the site above ground and connected to an inverter. Thus, the need for a combiner box at the end of each row and the trenching are eliminated. In addition, the amount of wiring required for the overall PV system is reduced.

According to an embodiment, an electrical connector, includes a body formed from an electrically conductive material, the body defining an open channel configured to receive a first electrical conductor, at least one first threaded hole transverse to and in communication with the open channel, a plurality of bores extending toward the open channel, each bore configured to receive a second electrical conductor, and a second threaded hole associated with each bore transverse to and in communication with the associated bore. The connector also includes at least one first set screw configured to mate with the at least one threaded hole in communication with the open channel and configured to secure the first electrical conductor within the open channel. The connector also includes a plurality of second set screws, a second set screw configured to mate with the threaded hole in communication with an associated bore and configured to secure the second electrical conductor within the bore.

In some embodiments, the electrical connector includes an insulation piercing feature configured to pierce insulation of the first electrical conductor, such as an insulation piercing feature is positioned at an end of the first set screw or an insulation piercing feature in the form of an electrically conductive blade member positioned within the open channel along a longitudinal axis thereof.

Further provided is a photovoltaic system, including a first photovoltaic series string including a plurality of photovoltaic modules connected in series, a second photovoltaic series string including a plurality of photovoltaic modules connected in series, and a plurality of the electrical connectors. A first one of the plurality of electrical connectors connects an electrical conductor from a positive terminal of the first photovoltaic series string to the first electrical connector, and a second one of the plurality of electrical connectors connects an electrical conductor from a negative terminal of the first photovoltaic series string to the negative conductor.

In some embodiments, the first one of the plurality of electrical connectors further connects an electrical conductor from a positive terminal of the second photovoltaic series string to the positive conductor, and the second one of the plurality of electrical connectors further connects an electrical conductor from a negative terminal of the second photovoltaic series string to the negative conductor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

An insulation piercing connector (IPC) is disclosed herein. Reference will now be made in detail to the illustrative embodiments of the present disclosure, which are illustrated in the accompanying figures.

Figure 2:
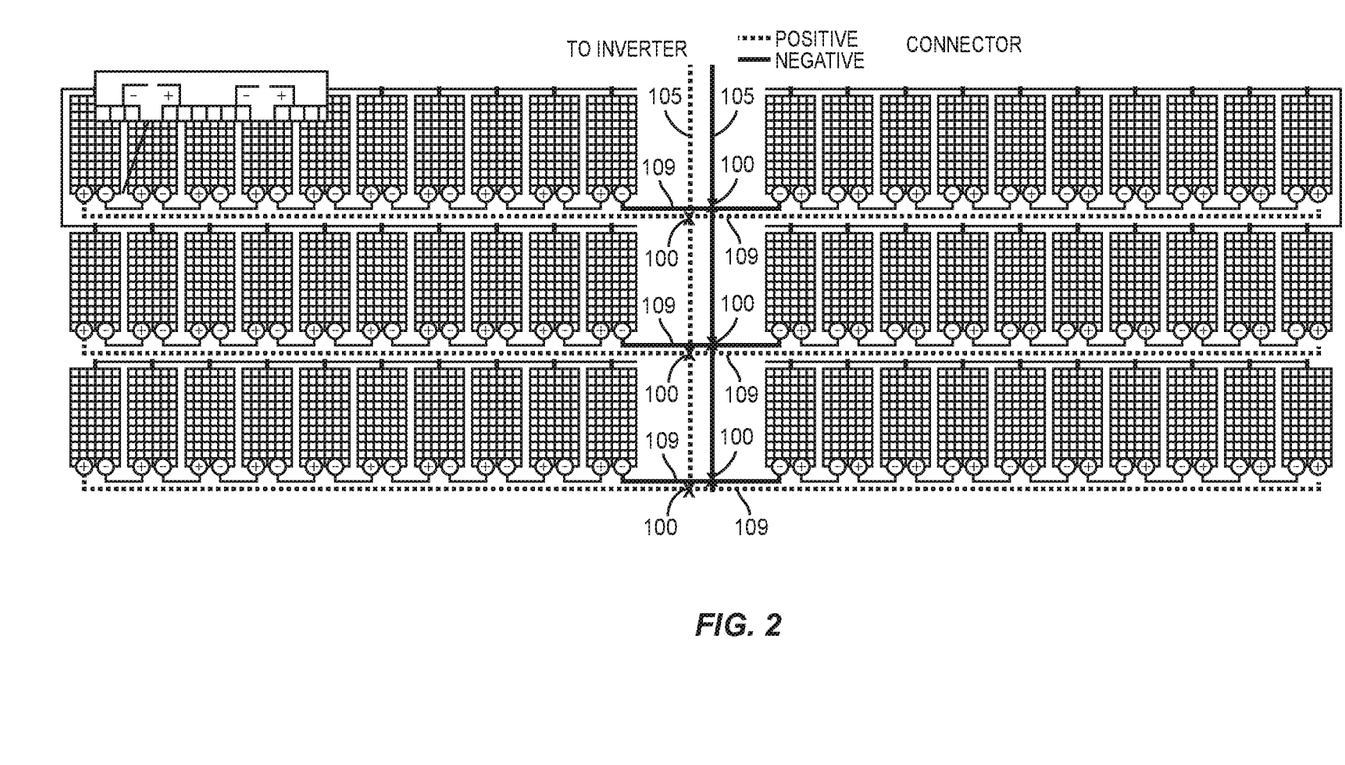
FIG. 2 is a diagram illustrating a PV system according to the present disclosure.

A PV system including an IPC 100 of the present disclosure is illustrated in FIG. 2. In the exemplary embodiment, PV modules/panels are connected to one another in series to form PV series strings. The PV modules may be connected to one another using MC4 connectors, the IPCs 100, or other means. Each of the PV series strings are connected to main conductors 105, such as a positive main conductor 105 and a negative main conductor 105. In the exemplary embodiment, each of the positive and negative main conductors 105 are insulated wires. A plurality of IPCs 100 are shown in FIG. 2. Each IPC 100 in FIG. 2 connects electrical conductors from each PV module, and/or each PV series string, to the main conductor 105. In some embodiments, one IPC 100 connects an electrical conductor from each of two PV series strings to one of the main conductors 105. As will be shown and described, IPC 100 can be configured to connect more than two electrical conductors to each main conductor 105. The IPCs 100 eliminate the need for combiner boxes at the end of each row and reduces the amount of wiring required in the PV system.

In an embodiment illustrated in FIGS. 3-8, IPC 100 is shown. IPC 100 includes a body 101, at least one channel set screw 102, and a plurality of bore set screws 103. Body 101, channel set screw 102, and bore set screws 103 are made from electrically conductive material, e.g., aluminum, copper, etc. In the exemplary embodiment, the body 101 is a single piece of electrically conductive material.

Body 101 defines a channel 104 positioned along a channel axis A. Channel 104 spans across the entire length of body 101. Channel 104 is configured to accept an electrical conductor 105. Channel 104 preferably is configured arcuate in shape and generally C-shaped in cross section. The shape and open configuration of the channel 104 allows it to be easily wrapped at least partially around and connect anywhere along the length of a wire. The size of channel 104 is configured to accept different sizes of electrical conductor 105, which can range from 1000 kcmil to 4/0 awg depending on the application; larger and smaller sizes are contemplated. Channel 104 can also be configured to accept a range of sizes of electrical conductor 105, for example, an IPC 100 can include a channel 104 configured to accept an electrical conductor 105 from 1000 kcmil to 500 kcmil, and another IPC 100 can include a channel 104 configured to accept an electrical conductor 105 from 250 kcmil to 4/0 awg.

Body 101 also includes a channel lip 106 that overhangs channel 104 to assist in securing conductor 105 within channel 104. In the exemplary embodiment, the channel lip 106 is generally arc-shaped with a semi-cylindrical interior wall.

Figure 6:
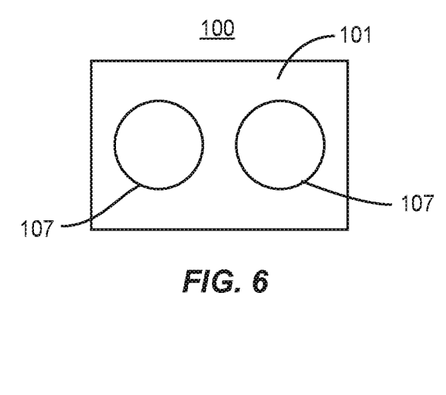
FIG. 6 is a front plan view of the IPC according to an embodiment of the present disclosure.
Figure 7:
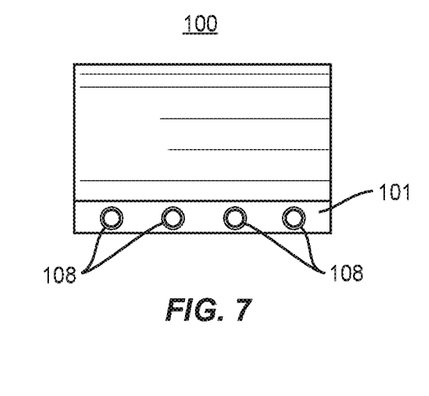
FIG. 7 is a rear plan view of the IPC according to an embodiment of the present disclosure.
Figure 8:
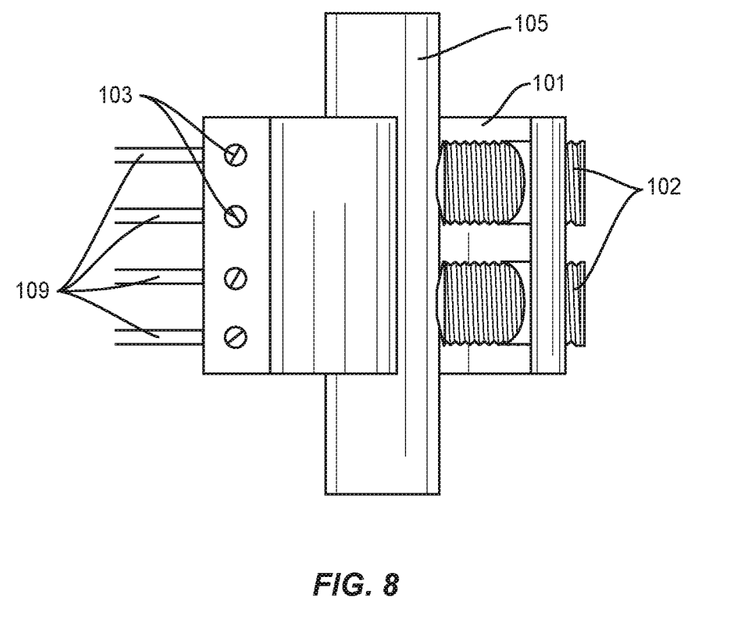
FIG. 8 is a top plan view of the IPC according to an embodiment of the present disclosure.

Body 101 defines at least one threaded channel set screw hole 107 extending from the rear of body 101 into channel 104 (see FIG. 6). Channel set screw hole 107 is configured to mate with channel set screw 102. When engaged with body 101, channel set screw 102 is extendable into channel 104 and contacts electrical conductor 105. In the exemplary embodiment, the channel set screw 102 extends substantially perpendicular to the electrical conductor 105.

Figure 3:
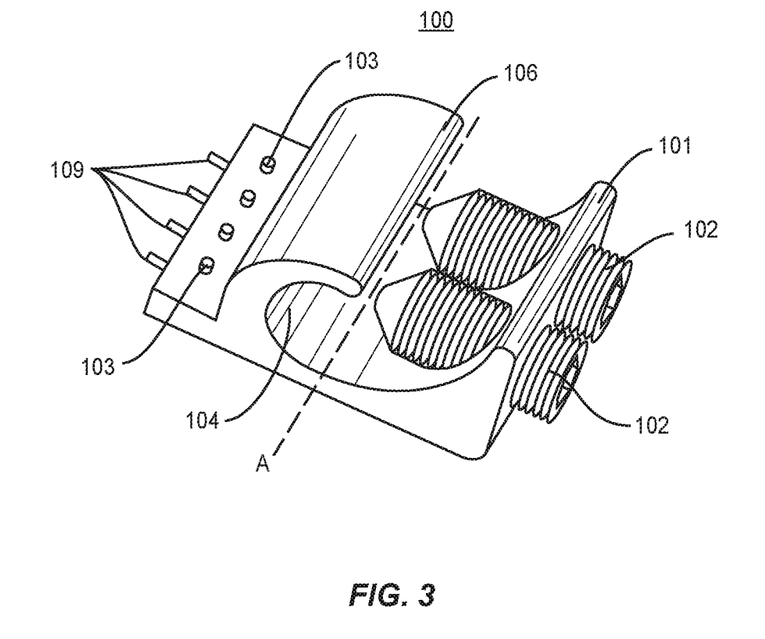
FIG. 3 is a perspective view of an IPC according to an embodiment of the present disclosure.
Figure 4:
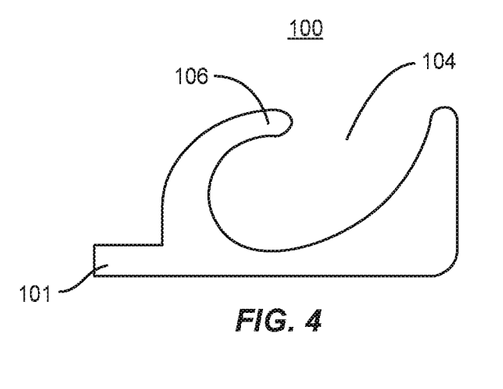
FIG. 4 is a side plan view of the IPC according to an embodiment of the present disclosure.
Figure 5:
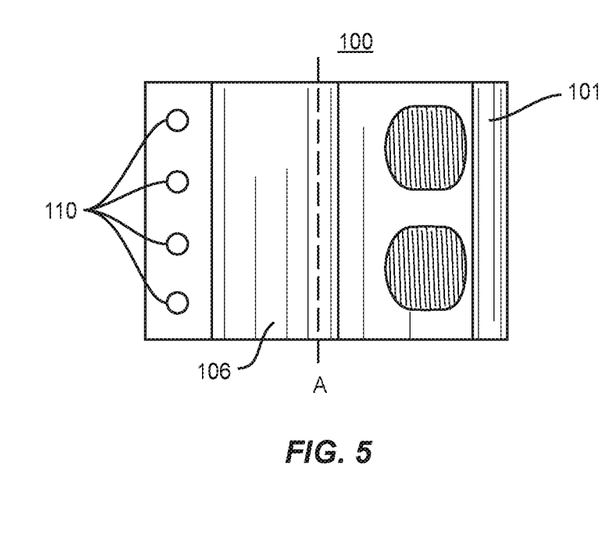
FIG. 5 is a top plan view of the IPC according to an embodiment of the present disclosure.

In one embodiment, shown in FIG. 3, channel set screw 102 includes a piercing end that engages with and pierces through the insulation covering electrical conductor 105 and into electrical conductor 105 to produce an electrical connection between electrical conductor 105 and IPC 100.

Figure 9:
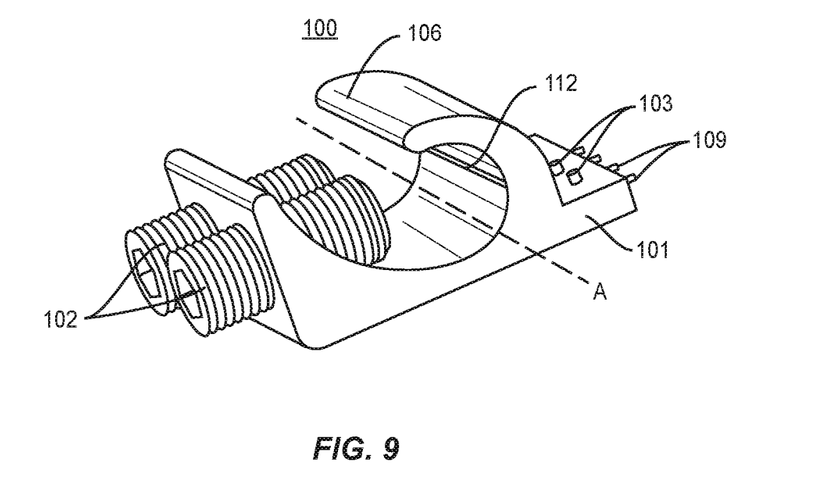
FIG. 9 is a perspective view of an IPC according to an embodiment of the present disclosure.
Figure 10:
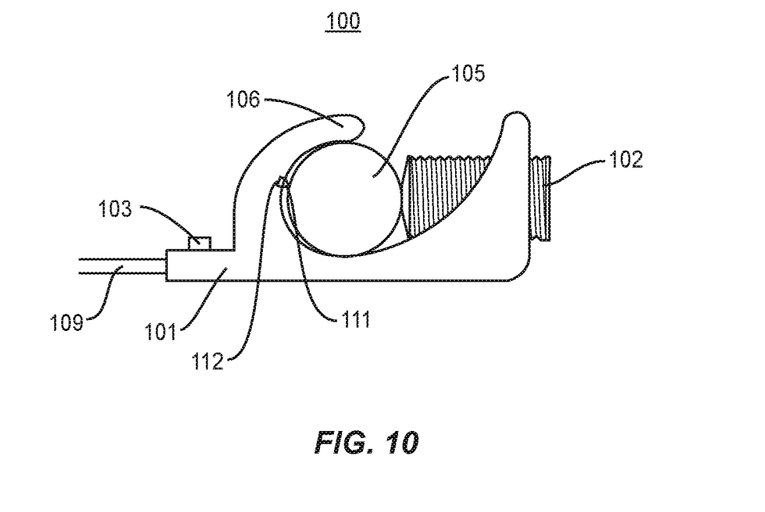
FIG. 10 is a side plan view of the IPC according to an embodiment of the present disclosure.
Figure 11:
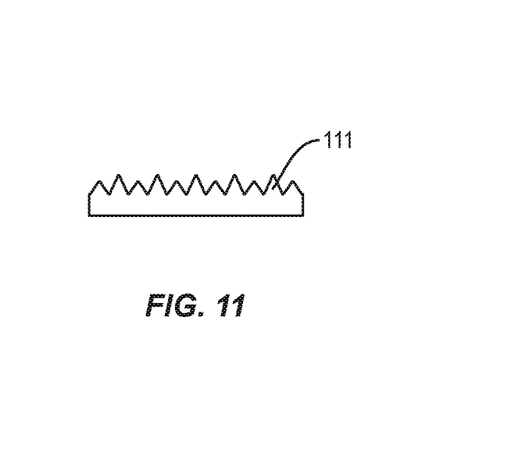
FIG. 11 is a diagram illustrating a piercing element for the IPC according to an embodiment of the present disclosure.
Figure 12:
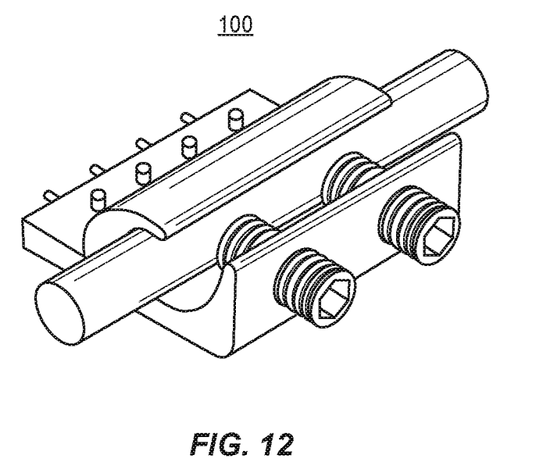
FIG. 12 is a perspective view of an IPC according to an embodiment of the present disclosure.
Figure 13:
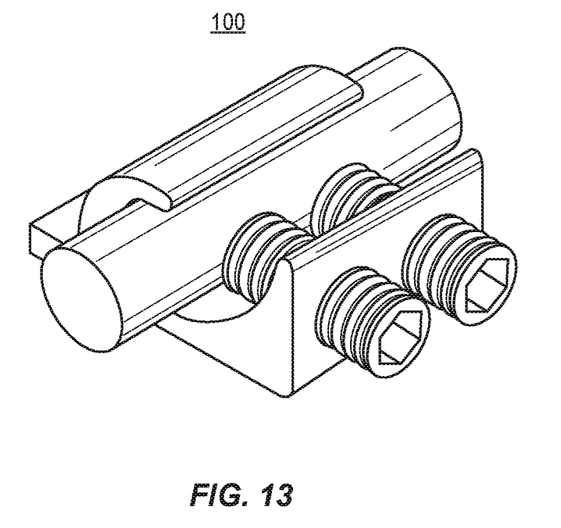
FIG. 13 is a perspective view of an IPC according to an embodiment of the present disclosure.

In another embodiment illustrated in FIGS. 9-11, IPC 100 can include a piercing element 111 positioned within channel 104 that would pierce the insulation of electrical conductor 105 when force is applied by channel set screws 102, and engage and make an electrical connection with electrical conductor 105. Piercing element 111 is made from an electrically conductive material, e.g. aluminum, copper, tin-plated copper, etc. In this embodiment, channel set screws 102 can include a flat head instead of the piercing head described above. In other embodiments, both piercing element 111 and channel set screws 102 with piercing heads can be included.

Body 101 defines a channel 112 for receiving piercing element 111. Channel 112 is positioned within channel 104 and along axis A. In addition to being separate components, it is contemplated to manufacture body 101 and piercing element 111 as a single monolithic component. Piercing element 111 is configured to pass through the insulation and make electrical contact with electrical conductor 105; other forms of piercing element 111 are contemplated, for example, a series of spikes extending into channel.

Body 101 defines a plurality of bores 108 for receiving electrical conductors, such as electrical conductors (e.g., PV wires) from the PV modules. The exemplary embodiment includes four bores 108, however the IPC 100 may also have two bores 108, three bores 108, or greater than four bores 108. In some embodiments, the bores 108 extend along an axis substantially parallel to the bores 107. In some embodiments, the bores 108 extend along an axis generally perpendicular to axis A of channel 104. Bores 108 extend toward, but preferably not into, channel 104. Each bore 108 is configured to accept an electrical conductor 109. The size of each bore 108 is configured to accept electrical conductor 109, which can range from #4 awg to #14 awg depending on the application; larger and smaller sizes are contemplated. Bores 108 can also be configured to accept a range of sizes of electrical conductor 109, for example, an IPC 100 can include a bore 108 configured to accept an electrical conductor 109 from #6 awg to #10 awg.

Body 101 also defines threaded bore set screw holes 110. A bore set screw hole 110 extends from the top of body 101 into a bore 108. Each bore set screw hole 110 is configured to mate with bore set screw 103. When engaged with body 101, bore set screw 103 will extend into bore 110 and contact electrical conductor 109.

In one embodiment, bore set screw 103 includes a piercing end that engages with and pierces through the insulation and into electrical conductor 109 to produce an electrical connection between electrical conductor 109 and IPC 100. In another embodiment, a piercing element (not shown) can be included in bores 110. In yet another embodiment, it can be required that any insulation at an end of electrical conductor 109 be removed before insertion into bore 110, which will then allow bore set screws 103 to have a flat head for contact with electrical conductor 109.

It is also contemplated that IPC 100 can be protected against ultraviolet radiation and/or other environmental elements (e.g., rain) with the inclusion of a silicon buffer, cover, and/or enclosure. In some embodiments, a silicon encapsulation covers all or at least part of the exterior surfaces of the IPC 100.

IPC 100 is preferably made from materials to be electrically rated for both aluminum and copper electrical conductors. In addition, IPC 100 is preferably rated for at least 1500 volts, and preferably even higher.

Each of the components that are used to electrically connect the electrical conductors are constructed of electrically conductive materials, for example, one or more of the following: aluminum, copper, bronze, steel, etc.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical connector, comprising:
   a body formed as a single piece of electrically conductive material, the body defining:
   an open channel configured to receive a first electrical conductor;
   at least one first threaded hole transverse to and in communication with the open channel;
   a plurality of bores extending toward the open channel, each bore configured to receive a second electrical conductor, wherein each of the plurality of bores extends substantially parallel to said at least one first threaded hole; and
   a second threaded hole associated with each bore transverse to and in communication with the associated bore;
   at least one first set screw configured to mate with the at least one first threaded hole in communication with the open channel, a distal end of the at least one first set screw engaging against the first electrical conductor to secure the first electrical conductor within the open channel;
   a plurality of second set screws, each second set screw configured to mate with one of the second threaded holes in communication with an associated bore and configured to secure the second electrical conductor within the bore.

2. The electrical connector of claim 1, wherein said open channel has a first diameter and each of said plurality of bores has a second diameter, the first diameter being at least two times greater than the second diameter.

3. The electrical connector of claim 2, wherein said at least one first threaded hole has a third diameter and each of said second threaded holes has a fourth diameter, the third diameter being greater than the fourth diameter.

4. The electrical connector of claim 1, further comprising at least one insulation piercing feature configured to pierce insulation of the first electrical conductor, wherein the at least one insulation piercing feature is positioned at the distal end of the first set screw.

5. The electrical connector of claim 4, wherein the at least one insulation piercing feature further includes an electrically conductive blade member positioned within the open channel along a longitudinal axis thereof.

6. The electrical connector of claim 4, further comprising an insulation piercing feature configured to pierce the insulation of the second electrical conductor, wherein the insulation piercing feature is positioned at an end of the second set screw.

7. The electrical connector of claim 1, wherein the body further comprises a channel lip extending over the channel configured to accept the first electrical conductor.

8. The electrical connector of claim 1, wherein the channel includes an arcuate internal surface.

9. The electrical connector of claim 1, wherein the channel is configured to accept an electrical conductor of 1000 kcmil to 4/0 awg.

10. The electrical connector of claim 1, wherein the bores are configured to accept an electrical conductor of #4 awg to #14 awg.

11. The electrical connector of claim 1, wherein the channel is C-shaped in cross section.

12. The electrical connector of claim 1, further comprising a silicon encapsulation over at least a portion of an exterior of the electrical connector.

13. The electrical connector of claim 1, wherein each of the plurality of bores is substantially perpendicular to said open channel.

14. The electrical connector of claim 1, wherein said at least one first threaded hole includes two or more first threaded holes, and wherein said at least one first set screw includes two or more first set screws.

15. The electrical connector of claim 1, wherein said plurality of bores includes at least four bores, and wherein said plurality of second set screws includes at least four second set screws.

16. The electrical connector of claim 1, wherein each bore has an open proximal end to receive the second electrical conductor and a closed distal end inside the bore.

17. An electrical connector, comprising:
   a body formed as a single piece of electrically conductive material, the body defining:
   an open channel, including an arcuate internal surface, configured to receive a first electrical conductor;
   a plurality of first threaded holes transverse to and in communication with the open channel;
   a plurality of bores extending toward the open channel and substantially parallel to said plurality of first threaded holes, each bore configured to receive a second electrical conductor; and
   a second threaded hole associated with each bore transverse to and in communication with the associated bore;
   a plurality of first set screws, each first set screw configured to mate with one of the plurality of first threaded holes in communication with the open channel and configured to secure the first electrical conductor within the open channel;
   a plurality of second set screws, each second set screw configured to mate with one of the second threaded holes in communication with an associated bore and configured to secure the second electrical conductor within the bore; and
   an insulation piercing feature positioned at a distal end of each of said plurality of first set screws configured to pierce insulation of the first electrical conductor.

18. The electrical connector of claim 17, wherein each bore has an open proximal end to receive the second electrical conductor and a closed distal end inside the bore.

19. The electrical connector of claim 17, wherein said open channel has a first diameter, and each of said plurality of bores has a second diameter, the first diameter being at least two times greater than the second diameter.

20. The electrical connector of claim 19, wherein each of said plurality of first threaded holes has a third diameter, and each of said second threaded holes has a fourth diameter, the third diameter being greater than the fourth diameter.

\* \* \* \* \*